July 14, 1964   J. P. KEATING ETAL   3,140,741
FLUID PROPORTIONING APPARATUS
Filed June 17, 1963   4 Sheets-Sheet 4

INVENTORS.
JAMES P. KEATING
EUGENE J. SKERKOSKE
BY
ATTORNEY

United States Patent Office 3,140,741
Patented July 14, 1964

3,140,741
FLUID PROPORTIONING APPARATUS
James P. Keating and Eugene J. Skerkoske, Rockford, Ill., assignors to Eclipse Fuel Engineering Co., Rockford, Ill., a corporation of Illinois
Filed June 17, 1963, Ser. No. 288,184
19 Claims. (Cl. 158—119)

The present invention relates to a fluid proportioning apparatus and has particular reference to that type of apparatus which is illustrated and described in United States Letters Patent No. 2,840,153, granted on June 24, 1958 to Donald A. Campbell and Jack V. Margason, and entitled "Fluid Proportioning Apparatus." The particular fluid proportioning apparatus of the present application is an improvement upon, and has certain inherent advantages over, the apparatus of said Letters Patent.

The improved fluid proportioning apparatus comprising the present invention has been designed for use primarily in connection with the proportioning and mixing of the gaseous constituents of a combustible fuel mixture, such, for example, as fuel gas and air, the mixture being designed for use in industrial furnaces, ovens, boilers, and the like such as may be encountered in metal heat-treating, melting, annealing and similar operations, as well as in steam generating, hot water heating and other processes too numerous to mention. The invention is, however, capable of other uses and it may, if desired, with suitable modification, be employed for the proportioning and mixing of a liquid and a gas, or of two liquids, regardless of their nature or the use to which they ultimately may be put. Irrespective, however, of the particular use for which the inventioin may be employed, the essential features thereof are at all times preserved.

In connection with control of the proportioning of gaseous fuel and air for the purpose of obtaining a combustible fuel-air mixture which will conform to all phases of furnace operation and produce a uniformly efficient controlled furnace atmosphere at any given instant, numerous factors must be taken into account. Principal among these are changes in internal furnace pressure caused by an increase or decrease in the firing rate of the furnace burners, changes in frictional resistance offered to the gas or air manifold piping or other passages due to changes in the rate of flow of these gaseous media within the same, and changes in the pressure at which either the air or the gas is supplied to the proportioning apparatus. These factors, for reasons that are well known and, consequently, need not be discussed in detail herein, contribute toward erratic performance of the burner system in the absence of any means for adjusting the fuel-air ratio of the proportioning apparatus to produce the proper combustible fuel mixture which will produce optimum results and give the desired characteristics of flame in both the low and high firing range of the burner or burners of the system. In some instances, the effectiveness of the air inlet that leads to the proportioning apparatus will be reduced when the furnace is operating at maximum firing rate, and with a conventional proportioning apparatus, when an adjustment is made to increase the effectiveness of the air inlet at the high firing range, this effectiveness does not remain prevalent when the firing rate is reduced. In most proportioning apparatuses heretofore devised for the proportioning of gaseous fuel and air, wherever provision is made for varying the areas of the fuel and air inlets, a predetermined and fixed fuel-air ratio is maintained throughout the entire range of the burner operation. In a few such proportioning apparatuses, provision is made for varying the fuel-air ratio to increase the burner system efficiency at high firing rates, but in these instances, the rate of change in the fuel ratio is invariably constant with one factor increasing with respect to the other according to some form of arithmetical progression and can be regarded merely as a compromise and incapable of satisfying the requirements of widely differing burner installations.

The proportioning apparatus of the present invention is designed to overcome the above-noted limitations that are attendant upon the construction and use of conventional or standard proportioning apparatuses, and toward this end, it contemplates the provision of a novel means whereby practically all variables which may be encountered in any given burner installation may be compensated for so that the optimum fuel-air ratio will be obtained for any point in the firing range of the burner operation. This being the principal and general object of the invention, it is a further object to provide such a proportioning apparatus which is capable of initial adjustment by empirical methods to accommodate the fuel-air requirements of any given burner installation, and after such adjustment has once been made, it will be effective to control the operation of the particular burner installation with maximum efficiency indefinitely and throughout the entire firing range of the installation.

It is a further object of the invention to provide a novel proportioning apparatus in which the fuel-air ratio for any given burner installation may be changed at will in order to vary the pattern of operation of the installation by effecting certain initial adjustments, after which burner operation may be controlled throughout its entire range merely by manipulation of a single operating lever.

In aforementioned Letters Patent No. 2,840,153, there is disclosed a fuel proportioning apparatus in which fuel gas and air are admitted to a common mixing chamber within the casing of the apparatus, the air inlet to the mixing chamber being valve controlled. The gas inlet to the mixing chamber discharges gas thereto from an intermediate gas entry or manifold chamber and gas to this latter chamber is admitted through a series of entry ports which are individually controlled by needle valves. A cut-in valve of the slide type is adapted to uncover the entry ports in succession, and this cut-in valve is connected to the air control valve so that as the air control valve is progressively opened, additional gas entry ports are uncovered by the valve. In this manner, the general objects of the present invention broadly are attained. The present proportioning apparatus is an improvement over the patented apparatus briefly described above in that the entire gas entry chamber and its cut-in valve are eliminated, as are also the various needle valves which admit gas to the gas entry chamber. According to the present invention, a single slide valve admits gas to the common mixing chamber and the movements of this valve are regulated by adjustable cam means including a series of threaded adjusting screws, the function of which is regulably to vary the throw of the slide valve as the latter moves in unison with the air control valve. The adjusting screws vary the cam pattern which controls the movement of the slide valve in substantially the same manner that the needle valves of the patented apparatus vary the incremental increase of over-all gas entry port area. The manual controls for operating the present proportioning apparatus remain substantially the same as in the patented apparatus, the principal difference being that, in the patented apparatus, gas regulation is effected by adjusting a series of threaded needle valves, whereas in the present apparatus, gas regulation is effected by adjusting a series of threaded adjusting screws. Thus, by the present invention, a familiar and widely accepted mode of operation has been preserved, while at the same time, casting operations in the manufacture of the main body castings have been simplified. Additionally, by the elimination of numerous small valve structures, costly machining operations are eliminated.

The provision of a proportioning apparatus of the character briefly outlined above being among the more important objects of the invention, other ancillary objects are to provide an apparatus which is relatively simple in its construction and, therefore, may be manufactured at a low cost; one which is possessed of a minimum number of parts, especially moving parts, and, therefore, is unlikely to get out of order; one which is capable of being readily dismantled and reassembled for purposes of inspection, replacement of parts or repair; one which is rugged and durable and, therefore, is possessed of a relatively long life; one which lends itself readily to automatic operation in place of manual control if desired; and one which otherwise is well adapted to perform the services required of it.

With these and other objects in view, the invention consists in the novel construction, combination and arrangement of parts shown in the accompanying four sheets of drawings forming a part of this specification.

In these drawings:

FIG. 9 is a front elevational view of the main body casting employed in connection with the invention.

It is to be understood that the terms "gas" and "fuel" as used herein are inclusive of liquid fuel such as liquefied gas, as well as oil, both of the many kinds presently known and widely used. These terms have been used more or less indiscriminately but are intended to include gaseous or liquid fluids which, when combined with oxygen or air, produce a mixture which will support combustion. During the description of the present apparatus and of its operation, the term "combustible mixture" as employed herein refers to the combined volumes of gas and air intended to be used for combustion purposes after they have been discharged from the apparatus.

Figures 1, 2, 10:
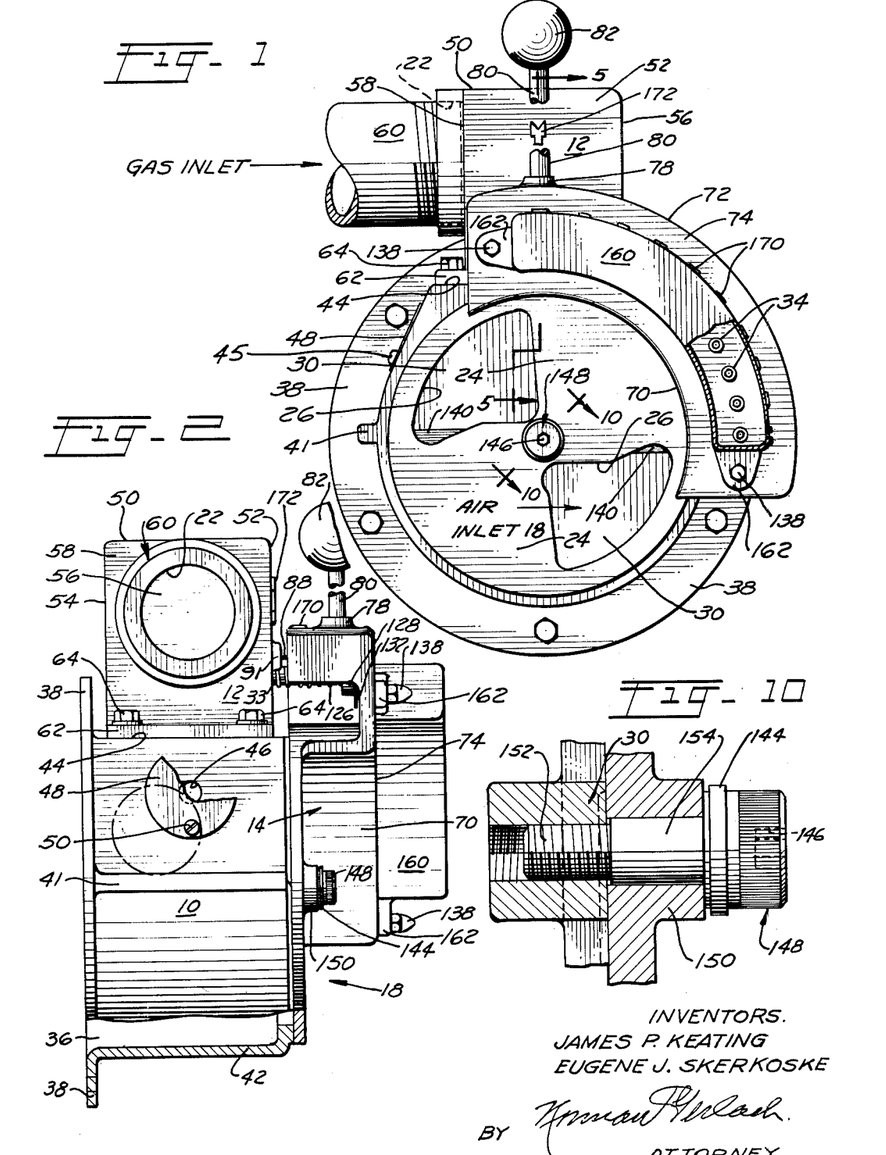
FIG. 1 is a front elevational view of a proportioning apparatus constructed in accordance with the principles of the present invention, certain parts being broken away and other parts being shown in section for illustrative purposes.
FIG. 2 is a side elevational view of the apparatus shown in FIG. 1, certain parts being broken away and other parts being shown in section for purposes of illustration.
FIG. 10 is an enlarged sectional view taken on the line 10—10 of FIG. 1.
Figures 3, 4:
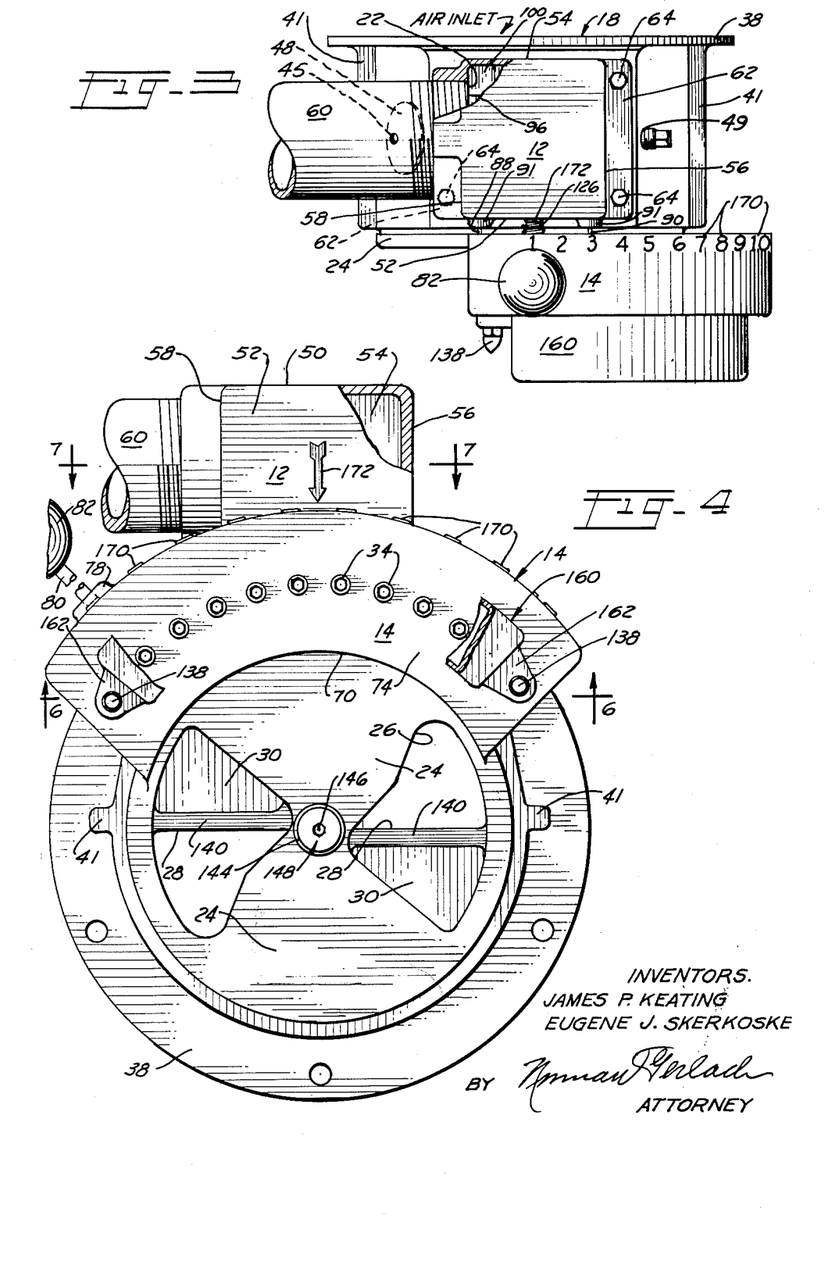
FIG. 3 is a top plan view of the apparatus shown in FIG. 1, certain parts being broken away and other parts being shown in section for illustrative purposes.
FIG. 4 is an enlarged fragmentary front elevational view of the apparatus shown in FIG. 1 with the parts shown in the position which they assume when the air and gas admission valves are in mid-positions.

Referring now to the drawings in detail and in particular to FIGS. 1 and 2, the proportioning apparatus of the present invention involves in its general organization three main castings, namely, a stationary main body casting 10 in the form of a casing, a stationary gas inlet casting 12 also in the form of a casing, and a movable rotary shutter and valve actuating casting 14. The main body casting 10 (see FIG. 5) establishes an internal gas and air mixing chamber 16 having an air inlet 18 and a regulable gas entry port 19 (see FIG. 5). The casting 12 establishes or forms a gas entry chamber 20 having a gas inlet 22 (see FIGS. 2 and 3). The casting 14 is an irregularly shaped casting which is rotatably mounted on the casting 10 for limited angular turning movement about the central longitudinal axis of the latter casting and includes an integral movable circular shutter plate 24 having generally triangular shutter openings 26 (see FIG. 4) therein for cooperation with similar shutter openings 28 in the circular front end wall 30 of the casting 10. The end wall 30 thus, in effect, constitutes a fixed shutter plate. The casting 14 further includes an arcuate channel-like housing portion 32 which embraces certain valve operating mechanism including a portion of an axialy shiftable valve-actuating rod 33 (see FIG. 6) and portions of a series of adjusting screws 34, the nature and function of which will become clear presently.

Briefly, and as will be described in greater detail presently, the air constituent of the combustible fuel mixture is adapted to pass axially through the assembled apparatus from right to left as viewed in FIGS. 2 and 5, that is, from the air inlet 18 through the shutter openings 26 and 28 to an air and gas discharge outlet 36 in the casting 10. The discharge outlet 36 is equipped with a suitable circular bolting flange 38 by means of which the proportioning apparatus may be connected to the intake side of a suction device or blower or to a suitable lead-out pipe (not shown) extending to a burner assembly or other equipment which is to be supplied with the combustible fuel mixture. Gas enters the apparatus through the gas inlet 22 and fills the gas entry chamber 20, from whence it is regulably delivered through the gas entry port 19 to the mixing chamber 16. A slide valve 40 controls the flow of gas to the mixing chamber 16 through the gas entry port 19 and is operable under the control of the previously mentioned adjusting screws 34 as well as under the control of angular movement of the casting 14 with respect to the castings 10 and 12. This angular movement of the casting 14 about the longitudinal axis of the casting 10, in addition to effecting regulation of the flow of gas into the mixing chamber 16 through the gas entry port 19, effects regulation of the flow of air into the mixing chamber 16 by automatic shutter manipulation, as will be described in detail subsequently.

Figure 5:
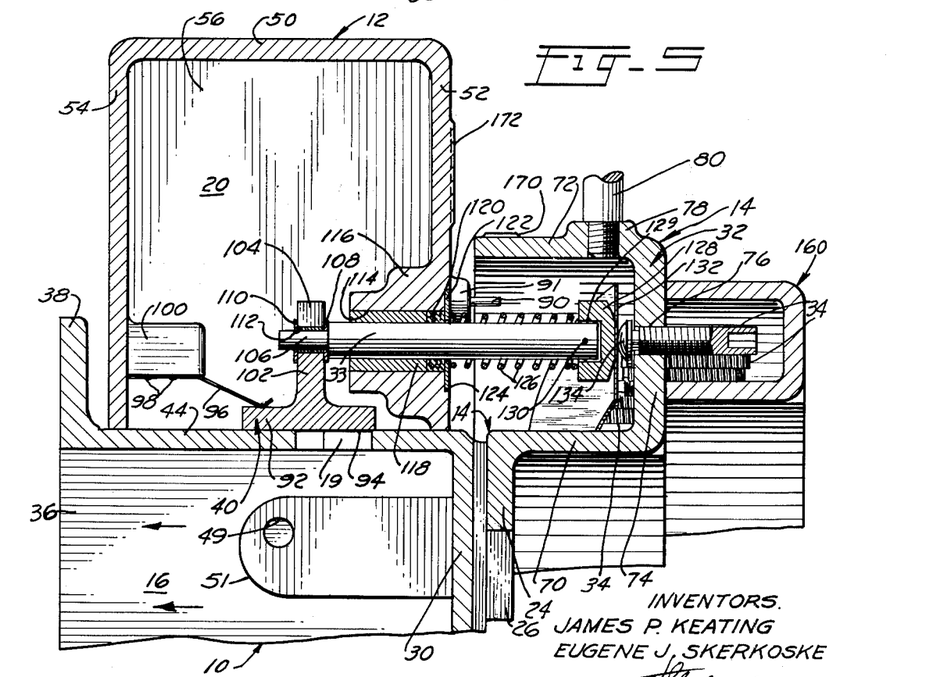
FIG. 5 is a sectional view taken substantially on the line 5—5 of FIG. 1.

Referring now to FIGS. 1, 2 and 5, the main body casting 10 is generally of cylindrical cup-shape design, and in addition to the previously mentioned circular front end wall 30, includes a substantially cylindrical side wall 42 having outside lateral horizontal strengthening ribs 41. The upper side of the side wall 42 is flattened to provide a horizontal top wall 44 (see FIGS. 2, 5, 7 and 8), the previously mentioned gas entry port 19 being formed in this wall 44. A small hole 46 (see FIGS. 2 and 3) in a thickened portion 47 of the cylindrical wall 42 establishes a minimum air supply inlet for the mixing chamber 16 and this hole is adjustably covered by a circular cut-off plate 48 which is pivoted on a screw 45. When there is requirement for minimum air in the mixing chamber, the circular cut-off plate may be shifted to the dotted line position as shown in FIG. 2 and the screw 45 tightened. Otherwise, the plate will assume the full line position and cover the hole 46 so as to close the aforementioned minimum air supply inlet. At a point diametrically opposed to the hole 46 is a plugged hole 49 (see FIG. 3). This hole is in a thickened portion 51 and is adapted for screw-threaded connection to a pressure sensitive element which may be operatively connected in a suitable control system for effecting movements of the rotatable casting 14 in the event that automation instead of manual control is desired.

The gas inlet casting 12 is generally of rectangular box-like design and comprises a top wall 50, front and rear vertical walls 52 and 54, and side walls 56 and 58. The gas inlet 22 extends through the side wall 58 and is adapted for connection to a suitable lead-in gas pipe extending from a source of fuel gas under pressure. The lower end of the gas inlet casting 12 is open and provides a rectangular seating rim 60 a portion of which appears in FIG. 6. Such rim has a lateral bolting flange 62 (see FIGS. 1, 2, 3 and 8) by means of which the casting 12 may be secured by bolts 64 to the flat horizontal top wall 44 of the main body casting 10. With the casting 12 positioned on the casting 10, the open lower end of the former casting communicates with the interior of the latter casting through the gas entry port 19 so that gas may flow from the gas entry chamber 20 to the mixing chamber 16 for commingling with the air which enters the chamber 16 through the registering shutter openings 26 and 28 in the shutter plate 24 and the end wall 30 of the casting 10 respectively.

The casting 14 includes the previously mentioned shutter plate 24 and the housing portion 32, the former being of circular disk-like design and the latter being of arcuate channel-shape design and extending around a portion of the periphery of the shutter plate. The housing portion 32 has an inner arcuate wall 70, an outer arcuate wall 72, and a connecting vertical wall strip 74. The previously mentioned threaded adjusting screws 34 extend through threaded holes 76 in the vertical wall strip 74, these holes being arranged in an arcuate row and being equally spaced apart. Ten such adjusting screws have been illustrated herein for exemplary purposes, but it will be understood that a greater or a lesser number of such adjusting screws may be provided if desired. A boss 78 is disposed adjacent to one end of the outer arcuate wall 72 and is threaded for reception of an operating lever in the form of a rod 80. The latter carries an operating knob 82 at the outer end thereof and is employed for the purpose of shifting the angular position of the casting 14 with respect to the main body casting 10. Inturned stop flanges 84 and 86 at the ends of the arcuate wall 72 are designed for cooperation with respective limit stop pins 88 and 90 which are supported in bosses 91 and project forwardly from the front wall 52 of the gas entry casting 12 to determine the extreme positions of the casting 14.

Figures 3, 6:
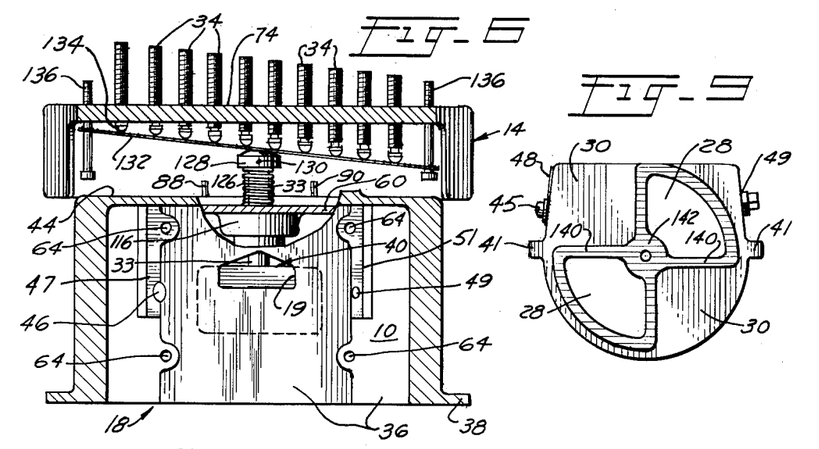
FIG. 6 is a reduced sectional view taken substantially on the line 6—6 of FIG. 4.
Figure 7:
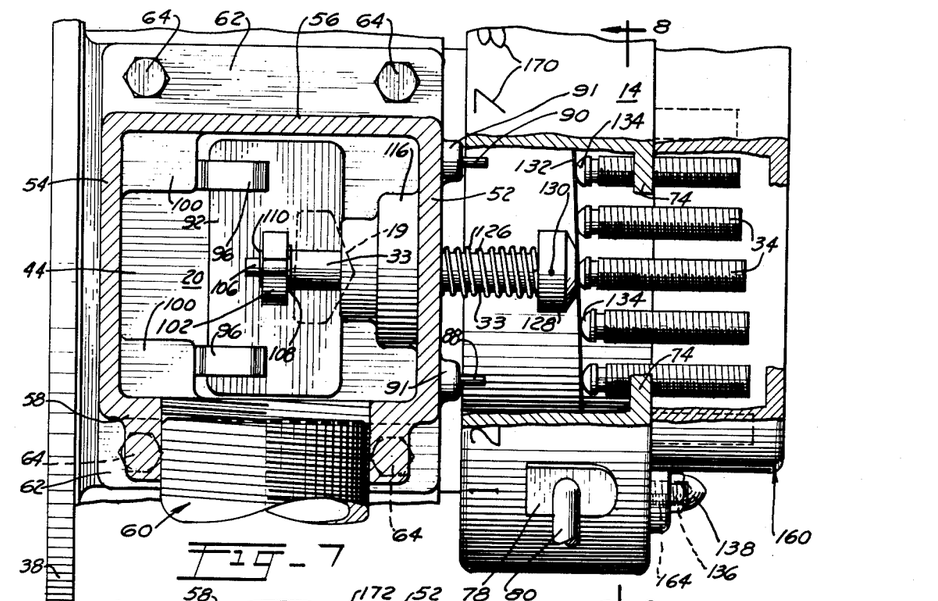
FIG. 7 is a sectional view taken on the line 7—7 of FIG. 4.
Figure 8:
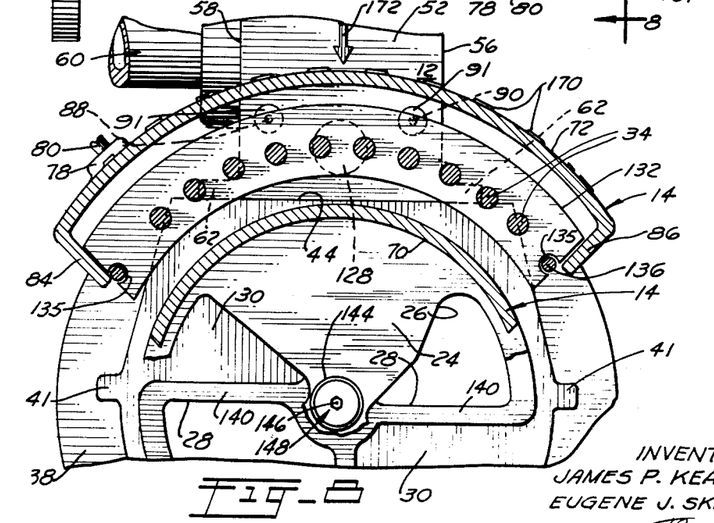
FIG. 8 is a sectional view taken on the line 8—8 of FIG. 7.

Referring now to FIGS. 5, 6 and 7, the gas entry port 19 in the flat horizontal top wall 44 of the main body casting 10 is of pentagonal configuration as best seen in FIG. 6 and the obtuse angular forward end thereof is adapted to be progressively uncovered during sliding movements of the slide valve 40 in one direction. The slide valve 40 is disposed within the gas entry chamber 20 and includes a foot portion 92. The latter is of rectangular design and presents a flat rectangular seating surface 94 which is designed for coextensive face-to-face sliding contact with the flat upper face of the top wall 44 of the gas and air mixing chamber 16. The seating surface 94 of the slide valve 40 is yieldingly maintained in firm frictional sealing engagement with the wall 44 by means of two leaf springs 96 which are secured by screws 98 to respective longitudinally spaced supporting blocks 100 on the wall 54 of the gas entry chamber. A post 102 projects upwardly from the medial regions of the foot portion 92 of the slide valve 40 and the upper end of this post is bifurcated as at 104 (see FIGS. 5 and 7) for reception of the reduced end 106 of the valve-actuating rod 33. A non-planar spring washer 108 and a split washer 110 straddle the post 102 and are received over the reduced end 106 of the rod 33 and serve to establish a driving connection without lost motion between the rod 33 and the slide valve 40. The split washer 110 seats within a narrow annular groove 112 in the reduced end 106 of the actuating rod 33.

The actuating rod 33 extends horizontally and projects through an opening 114 in a thickened boss 116 on the front wall 52 of the gas entry chamber 20. A bushing 118 is interposed between the rod 33 and the wall of the opening 114, and a lip seal 120 prevents egress of gas from the chamber 20 around the shaft. A washer 122 which is pressed in an annular recess 124 in the wall 52 retains the lip seal 120 in position and also serves as a seat for one end of a helical compression spring 126 which surrounds the rod 33. The other end of the spring 126 bears against a cup-shaped friction shoe 128 and the outer end of the rod 33 seats within a recess 129 in the cup-shaped friction shoe and is connected thereto by way of a pin 130.

The friction shoe 128 is designed for sliding contact with an arcuate contour strip 132 of flat light gauge spring steel stock. The strip is nested within the channel-shaped housing portion 32 of the casting 14. It follows the arcuate contour thereof and is designed for point contact with the inner opposed ends of the various adjusting screws 34, as best seen in FIG. 6. These opposed ends of the screws are provided with enlarged rounded heads 134 which establish the points of contact between the screws 34 and the strip 132. The compression spring 126 yieldingly urges the valve-actuating rod 33 forwardly so that the friction shoe 128 engages the flexible strip 132 and forces the latter forwardly into contact with the adjusting screws 34 which lend contour to the strip so that the latter presents a contoured cam surface for sliding movement of the friction shoe 128 therealong during angular turning movement of the casting 14. The particular contour of this cam surface deepnds, of course, upon the respective axial positions of the various adjusting screws 34. The pin 130 extends vertically through the rod 33 and the shoe 128 and the rod projects loosely into the recess 129 so that the shoe has limited floating movement on the end of the rod wherein it may seat squarely on the strip 132 during travel therealong.

To retain the flexible contour strip 132 in position within the housing portion 32 in its interposed relation between the friction shoe 128 and the adjacent ends of the adjusting screws 34, the extremities of the strip are formed with semi-circular notches 135 which loosely straddle respective pins 136 which are threadedly received through the wall strip 74 and are locked in position by cap nuts 138 (see FIG. 7). The strip 132 is slidably held between the two pins 142 but is capable of transverse flexing. In other words, the strip or any portion thereof is capable of bodily movement in the fore-and-aft direction of the pins 142. The strip 132 is of a length to span substantially the entire reach of the arcuate housing portion 32 of the casting 14. The friction shoe 128, under the influence of the rod 33 and the spring 126, serves to urge the flexible strip 132 forwardly toward the opposed ends of the various adjusting screws 34, the strip yielding at the point of contact with the shoe 128 and bridging the distance between adjacent pins to facilitate sliding movement of the shoe along the strip during turning movement of the casting 14 in either direction about the longitudinal axis of the casting 10.

It is to be noted from an inspection of FIGS. 2 and 5 that there is a narrow parting line between the front end wall 30 of the casting 10 and the opposed face of the shutter plate 24. However, to seal the shutter openings 26 and 28 when in register with one another, each of the two shutter openings 28 (see FIG. 9) is bounded by a raised marginal rib 140, the ribs diverging from a similarly raised boss 142 on the front end wall 30. The forward faces of these raised portions are preferably lapped to a high degree of flatness so that they will slide on the opposed flat face of the shutter plate 24 in sealing relationship with respect thereto. The shutter plate 24 is yieldingly urged against the raised marginal ribs 140 and the boss 142 by the action of a non-planar circular spring washer 144 (see also FIG. 10) which is interposed between the knurled Allen head 146 of a stud bolt 148 and the forward face of a circular boss 150 on the shutter plate 24. The reduced stem 152 of the stud bolt 148 is threadedly received in the boss 142 and the shutter plate is centrally pivoted on the cylindrical stud portion 154 of the bolt 148. By such an arrangement, the shutter plate 24 and, consequently, the casting 14 as a whole are pivotally mounted on the main body casting 10 with the mating shutter openings 26 and 28 in circumferential register with each other.

As shown in FIGS. 1, 2 and 5, an arcuate cup-shaped cover casting 160 is provided with lateral attachment ears 162 at the ends thereof. These ears 162 are formed with holes for reception over the projecting ends of the pins 136 which center the strip 132 within the housing portion 32 of the casting 14. The previously mentioned cap nuts 138 serve to hold the cover casting 160 removably in position on the housing portion 32, and when in position thereon, the casting encompasses the arcuate row of adjusting screws 34.

To facilitate adjustment of the angular position of the rotatable casting 14 with respect to the main body casting 10, the outer arcuate wall 72 of the housing portion 32 is provided with a series of raised indicia 170 (see FIGS. 3 and 4) which may be in the form of numerals ranging from 1 to 10 inclusive, such indicia being designed for selective register with a raised reference indicia 172 on the front wall 52 of the gas entry casting 12. The number of indicia 170 that are provided on the arcuate wall 72 is preferably, but not necessarily, equal to the number of adjusting screws 34 employed for regulating the movement of the slide valve 40.

Operation of Apparatus

In the operation of the above-described proportioning apparatus, the gas inlet 22 is connected through the pipe 66 to a source of fuel gas as a constant pressure, as, for example, gas issuing from a pressure regulator (not shown). The discharge outlet 36 is connected by means of the bolting flange 38 to a suction device, or to a delivery conduit (not shown) leading through a suction device, to a burner or a series of burners associated with the particular furnace or other equipment undergoing firing. The various adjusting screws 34 which control the throw of the slide valve 40 are individually adjusted to the desired pattern of operation of the proportioning apparatus so that the slide valve 40 will be operated in a predetermined manner to admit progressively increasing quantities of fuel gas from the gas entry chamber 20 to the mixing chamber 16 as the effective size of the shutter openings 26 and 28 is progressively increased.

This pattern of operation may be determined empirically during an initial test run of the equipment of a given installation to establish the necessary modification of the fuel-air adjustment for the different stages of feed flow of the proportioned combustible fuel mixture. For example, after the operating lever has been manipulated to bring the reference indicia 172 into register with the first of the movable indicia 170 at the commencement of the test run, if it is found that the flame characteristics at the burner are such that stoichiometric conditions do not obtain, the first adjusting screw 34 in the series of screws may be turned in one direction or the other so that it will transmit its endwise motion through the flexible strip 132 to the valve actuating rod 33 to the slide valve 40 which will move in one direction or the other to increase or decrease the flow of gas into the mixing chamber. When the desired flame condition for this particular setting of the operating lever 80 has been attained, the lever may be moved to the next setting thereof and the second adjusting screw 34 in the series similarly adjusted. These operations are repeated for the entire series of settings of the operating lever.

With the operating lever 80 in the upright position in which it is illustrated in FIGS. 1 and 2, the foot portion 92 of the valve 40 may, as shown in FIG. 6, completely cover the gas entry port 19 so that no gas will flow from the gas entry chamber 20 into the mixing chamber and the shutter openings 26 and 28 will be out of register with each other so that normally neither gas nor air will enter the mixing chamber 16. However, if it is desired that a flame be maintained at the burner for this "zero" setting of the operating lever 80, the circular cover plate 48 may be caused to uncover the minimum air supply inlet 46 in the side wall 58 of the gas entry chamber 20, and at the same time, the first adjusting screw 34 in the series (which at this setting will be in axial register with the friction shoe 128 and the valve-actuating rod 33) will be turned so as to advance the same into the housing portion 32 of the casting 14 to such an extent that the rod 33 will shift to the left, as viewed in FIG. 6, and cause the trailing edge of the foot portion 92 of the slide valve 40 to uncover a small portion of the gas entry port 19, thus admitting just enough gas to the mixing chamber to cooperate stoichiometrically with the air which has been admitted to the mixing chamber 16 through the minimum air supply inlet 46 to maintain the desired low flame condition. Thus, the proportioning device may be so adjusted that the "zero" setting of the valve and the shutter actuating rod 80 wherein the first movable indicia 170 registers with the fixed reference indicia 172 is a low maintenance flame setting rather than a complete gas and air shut-off setting.

In many installations, it is desirable that, for starting-up operations, a rich fuel mixture will obtain when the burners are initially fired to prevent possible back-firing in the system. Such a condition may be accommodated by advancing the first few adjusting screws 34 in the series to such an extent that a relatively rapid opening of the gas entry port 19 by the slide valve 40 will take place as the operating lever 80 is moved through the initial portion of its sweep. In any event, regardless of the particular setting of the various adjusting screws 34, advancing of the operating lever 80 will effect a bridging action between adjacent adjusting screws 34 by the flexible strip 132 so that, by a camming operation, the friction shoe 128 may move along the strip from one adjusting screw to the next screw. The entire span of the flexible strip 132 does not necessarily engage all of the adjusting screws simultaneously. This strip is a free floating strip and if the angle imparted to the limited region of the strip between two adjusting screws at the region where pressure is applied to the strip by the friction shoe 128 is sufficiently great, the remainder of the strip may have no contact with the adjusting screws. However, in any event, as the friction shoe moves into the vicinity of any given adjusting screw, contact between that screw and the flexible strip 132 is assured, and when there is accurate axial register between the adjusting screw and the friction shoe, a direct thrust involving a solid unyielding column of metal will extend from the adjusting screw through the strip 122, the shoe 128, and the rod 33 to the slide valve 40.

The flexible strip 122, although formed of light gauge spring steel is sufficiently flexible to allow for successive contact thereof with adjacent adjusting screws in the series regardless of the particular setting of the adjusting screws. However, it is not so flexible that when the friction shoe 128 is in between adjacent adjusting screws, there will be an appreciable sag of the strip at the point of contact with the friction shoe. Thus, there will be a uniform graduation in the movement of the valve as the friction shoe progresses from each adjusting screw to the next screw in the series.

In the normal operation of the operating lever 80, this lever will be advanced progressively through all of the various positons of adjustment of which it is capable, and at each succeeding position thereof, an additional increment of valve opening movement will be added to the previous opening movements which have been effected. This will result in the flow of an additional quantity of gas from the gas entry chamber 20 to the mixing chamber 16. Each succeeding position of the operating lever 80 will also be reflected by a different relative positioning of the shutter openings 24 and 26 whereby progressively increased effective shutter opening areas will be attained to increase the flow of air into the mixing chamber 16.

Whereas the invention has been shown in the accompanying drawings and described in this specification as embodying structure and details of a preferred embodiment of the invention, it will be understood that modifications may be made in the details of construction, form, and arrangement of the several parts, within the scope of the invention as defined in the appended claims without departing from the spirit or principle of the invention or sacrificing any of the advantages thereof.

Having thus described the invention what we claim as new and desire to secure by Letters Patent is:

1. A proportioning apparatus adapted to effect a combustible mixture of fuel and air for delivery to a burner or the like and comprising a main body casing establishing a mixing chamber and having a generally cylindrical wall defining an open-ended bore, the rear end of which constitutes a discharge outlet for the combustible mixture from the mixing chamber, and the front end of which constitutes an air inlet for the mixing chamber, said wall being provided with a gas entry port for the mixing chamber, a gas inlet casing defining a gas entry chamber, mounted on said main body casing exteriorly thereof and having an open end encompassing a portion of said generally cylindrical wall and in register with the gas entry port whereby communication between the gas entry and mixing chambers is established through said gas entry port, a fixed shutter plate extending across the front end of the mixing chamber, a rotatable shutter casting mounted on said main body casing for limited angular turning movements about the axis of said generally cylindrical wall and including a movable shutter plate designed for cooperation with said fixed shutter plate, there being cooperating shutter openings in said shutter plates defining a variable air inlet opening for the mixing chamber, a slide valve disposed within said gas entry chamber and movable across said gas entry port between open and closed positions, an actuating rod connected to the slide valve and projecting outwardly through a wall of the gas inlet casing, cooperating cam means on said shutter casting and engageable with the outwardly projecting portion of the actuating rod for effecting simultaneous movement of the slide valve and movable shutter plate during angular turning movements of the shutter casting, and an operating lever on said shutter casting.

2. A proportioning apparatus as set forth in claim 1 and wherein said cam means comprises an elongated arcuate cam element mounted for endwise shifting movements during angular turning of the shutter casting, the projecting end of said actuating rod being in register with said cam element, and spring means yieldingly urging said actuating rod against said arcuate cam element.

3. A proportioning apparatus as set forth in claim 1 and wherein said cam means comprises an elongated arcuate cam element mounted for endwise shifting movements during angular turning of the shutter casting, and spring means yieldingly urging said actuating rod against said arcuate cam element and in a direction to effect closing movements of the slide valve.

4. A proportioning apparatus as set forth in claim 1 and wherein said cam means comprises an elongated flexible arcuate cam element mounted for endwise shifting movements during angular turning of the shutter casting, spring means yieldingly urging said actuating rod against said arcuate cam element and in a direction to effect closing movements of the slide valve, and means for effectively varying the cam contour of said flexible cam element.

5. A proportioning apparatus adapted to effect a combustible mixture of fuel and air for delivery to a burner or the like and comprising a main body casing establishing a mixing chamber and having a generally cylindrical wall defining an open-ended bore the rear end of which constitutes a discharge outlet for the combustible mixture from the mixing chamber, and the front end of which constitutes an air inlet for the mixing chamber, said wall being provided with a gas entry port for the mixing chamber, a gas inlet casing defining a gas entry chamber, mounted on said main body casing exteriorly thereof and having an open end encompassing a portion of said generally cylindrical wall and in register with the gas entry port whereby communication between the gas entry and mixing chambers is established through said gas entry port, a fixed shutter plate extending across the front end of the mixing chamber, a rotatable shutter casting mounted on said main body casing for limited angular turning movements about the axis of said generally cylindrical wall and including a movable shutter plate designed for cooperation with said fixed shutter plate, there being cooperating shutter openings in said shutter plates defining a variable air inlet opening for the mixing chamber, a slide valve disposed within said gas entry chamber and movable across said gas entry port between open and closed positions, a valve actuating rod connected to the slide valve and projecting outwardly through a wall of the gas inlet casing, an arcuate wall strip on said shutter casting, a plurality of adjusting screws arranged in an arcuate row and projecting through said wall strip for individual axial adjustment thereon, said adjusting screws being selectively movable into axial register and alignment with the valve actuating rod upon angular turning of the shutter casting, an elongated arcuate strip of flexible spring stock interposed between the projecting end of said valve actuating rod and the opposed ends of the adjusting screws and bridging the distances between adjacent screws and against which said projecting end of the actuating rod effectively bears, spring means yieldingly urging said rod in the direction of said flexible strip, and an operating lever on said shutter casting.

6. A proportioning apparatus as set forth in claim 5 and including, additionally, an elongated arcuate cup-shaped cover casting removably secured to said wall strip and enclosing the ends of said adjusting screws remote from the flexible strip.

7. A proportioning apparatus adapted to effect a combustible mixture of fuel and air for delivery to a burner or the like and comprising a main body casing establishing a mixing chamber and having a generally cylindrical wall defining an open-ended bore the rear end of which constitutes a discharge outlet for the combustible mixture from the mixing chamber, and the front end of which constiutes an air inlet for the mixing chamber, said wall being provided with a gas entry port for the mixing chamber, a gas inlet casing defining a gas entry chamber, mounted on said main body casing exteriorly thereof and having an open end encompassing a portion af said generally cylindrical wall and in register with the gas entry port whereby communication between the gas entry and mixing chambers is established through said gas entry port, a fixed shutter plate extending across the front end of the mixing chamber, a rotatable shutter casting mounted on said main body casing for limited angular turning movements about the axis of said generally cylindrical wall and including a movable shutter plate designed for cooperation with said fixed shutter plate, there being cooperating shutter openings in said shutter plates defining a variable air inlet opening for the mixing chamber, a slide valve disposed within said gas entry chamber and movable across said gas entry port between open and closed positions, a valve actuating rod connected to the slide valve and projecting outwardly through a wall of the gas inlet casing, an arcuate wall strip on said shutter casting, a plurality of adjusting screws arranged in an arcuate row and projecting through said wall strip for individual axial adjustment thereon, said adjusting screws being selectively movable into axial register and alignment with the valve actuating rod upon angular turning of the shutter casting, a friction shoe loosely mounted on the projecting end of said valve actuating rod, an elongated arcuate strip of flexible spring stock interposed between the friction shoe and the opposed ends of the adjusting screws and bridging the distances between adjacent screws and against which said friction shoe bears, spring means yieldingly urging said rod in the direction of said flexible strip, and an operating lever on said shutter casting.

8. A proportioning apparatus as set forth in claim 7 and wherein said friction shoe is formed with a circular socket into which the projecting end of the valve actuating rod extends, and a pin projecting through the projecting end of the valve actuating rod and wall of the socket for floatingly securing the friction shoe on the projecting end of the rod while permitting limited angular swinging movement of the shoe about an axis which extends transversely of the arcuate strip.

9. A proportioning apparatus adapted to effect a combustible mixture of fuel and air for delivery to a burner or the like and comprising a main body casing establishing a mixing chamber and having a generally cylindrical wall defining an open-ended bore the rear end of which constitutes a discharge outlet for the combustible mixture from the mixing chamber, and the front end of which constitutes an air inlet for the mixing chamber, said wall being provided with a gas entry port for the mixing chamber, a gas inlet casing defining a gas entry chamber, mounted on said main body casing exteriorly thereof and having an open end encompassing a portion of said generally cylindrical wall and in register with the gas entry port whereby communication between the gas entry and mixing chambers is established through said gas entry port, a fixed shutter plate extending across the front end of the mixing chamber, a rotatable shutter casting mounted on said main body casing for limited angular turning movements about the axis of said generally cylindrical wall and including a movable shutter plate designated for cooperation with said fixed shutter plate, there being cooperating shutter openings in said shutter plates defining a variable air inlet opening for the mixing chamber, a slide valve disposed within said gas entry chamber and including a foot portion having an attachment post projecting outwardly therefrom, said foot portion being slidable on said wall in cut-off relationship with respect to the gas entry port between open and closed positions, a pair of leaf springs carried by said gas inlet casing and bearing against said foot portion for urging the same into sealing engagement with said wall, a valve actuating rod having one end loosely connected to said attachment post, said rod projecting through a wall of the gas inlet chamber, and arcuate wall strip on said shutter casting, a plurality of adjusting screws arranged in an arcuate row and projecting through said wall strip for individual axial adjustment thereon, said adjusting screws being selectively movable into axial register and alignment with the valve actuating rod upon angular turning of the shutter casting, an elongated arcuate strip of flexible spring stock interposed between the projecting end of said valve actuating rod and the opposed ends of the adjusting screws and bridging the distances between adjacent screws and against which said projecting end of the actuating rod effectively bears, spring means yieldingly urging said rod in the direction of said flexible strip, and an operating lever on said shutter casting.

10. A proportioning apparatus as set forth in claim 9 and including, additionally, a spring-biased lost-motion connection between said one end of the actuating rod and said attachment post.

11. A proportioning apparatus adapted to effect a combustible mixture of fuel and air for delivery to a burner or the like and comprising a main body casing of generally cylindrical design, having its axis extending horizontally and provided with a flattened side wall portion establishing a horizontal top wall for an internal fuel and air mixing chamber, the rear end of said chamber being open and providing a discharge outlet for the combustible mixture, a fixed shutter plate extending across the front end of the mixing chamber, said top wall being formed with a gas entry port therein for the mixing chamber, an inverted cup-shaped gas entry casing having an open lower end seated upon said top wall and, in combination therewith, defining a gas entry chamber, one wall of the gas entry casing being provided with a gas inlet for the gas entry chamber, a slide valve having a flat foot portion slidable upon said top wall of the main body casing within the gas entry chamber between closed and open positions over the gas entry port, an attachment post projecting upwardly from said foot portion, said gas entry chamber being provided with a vertical front wall, an actuating rod for the slide valve having its rear end loosely connected to said attachment post and projecting forwardly therefrom and extending through said vertical front wall in sealing relationship, a shutter casting rotatably mounted on said main body casing for limited angular turning movements about the axis of said main body casing and including a movable shutter plate designed for cooperation with said fixed shutter plate, there being cooperating shutter openings in said shutter plates, defining a variable air inlet for the mixing chamber, said shutter casting having a vertical wall portion spaced from and in opposition to said vertical wall of the gas entry chamber, a plurality of adjusting screws arranged in an arcuate row and projecting through said vertical wall portion for individual axial adjustment, said adjusting screws being selectively movable into axial register and alignment with said valve actuating rod upon turning movement of the shutter casting, an elongated arcuate strip of thin spring steel stock interposed between the projecting end of the valve actuating rod and the opposed ends of the adjusting screws and against which said projecting end of the actuating rod effectively bears, spring means yieldingly urging said rod in the direction of said flexible strip, and an operating lever on said shutter casting.

12. A proportioning apparatus adapted to effect a combustible mixture of fuel and air for delivery to a burner or the like and comprising a main body casing establishing a mixing chamber and having a generally cylindrical wall defining an open-ended bore the rear end of which constitutes a discharge outlet for the combustible mixture from the mixing chamber, and the front end of which constitutes an air inlet for the mixing chamber, said wall being provided with a gas entry port for the mixing chamber, a gas inlet casing defining a gas entry chamber, mounted on said main body casing exteriorly thereof and having an open end encompassing a portion of said generally cylindrical wall and in register with the gas entry port whereby communication between the gas entry and mixing chambers is established through said gas entry port, a fixed shutter plate extending across the front end of the mixing chamber, a rotatable shutter casting mounted on said main body casing for limited angular turning movements about the axis of said generally cylindrical wall and including a movable shutter plate designed for cooperation with said fixed shutter plate, there being cooperating shutter openings in said shutter plates defining a variable air inlet opening for the mixing chamber, a slide valve disposed within said gas entry chamber and movable across said gas entry port in cut-off relationship between open and closed positions, an actuating rod connected to the slide valve and projecting outwardly through a wall of the gas inlet casing, cooperating cam means on said shutter casting and the outwardly projecting portion of the actuating rod for effecting simultaneous movement of the slide valve and movable shutter plate during angular turning movements of the shutter casting, a minimum air supply inlet formed in said generally cylindrical wall of the main body casing, a cut-off plate pivoted to said wall for selectively closing and opening said minimum air supply inlet, and an operating lever on said shutter casting.

13. A proportioning apparatus as set forth in claim 11 and wherein said gas entry port is generally triangular and wherein the slide valve is provided with a linearly straight cut-off edge which is movable in cut-off relationship with respect to an apex of the triangular gas entry port.

14. A proportioning apparatus adapted to effect a combustible mixture of fuel and air for delivery to a burner or the like and comprising a main body casing of generally cylindrical design, having its axis extending horizontally and provided with a flattened side wall portion establishing a horizontal top wall for an internal fuel and air mixing chamber, the rear end of said chamber being open and providing a discharge outlet for the combustible mixture, a fixed shutter plate extending across the front end of the mixing chamber, said top wall being formed with a gas entry port therein for the mixing chamber, an inverted cup-shaped gas entry casing having an open lower end seated upon said top wall and, in combination therewith, defining a gas entry chamber, one wall of the gas entry casing being provided with a gas inlet for the gas entry chamber, a slide valve having a flat foot portion slidable upon said top wall of the main body casing within the gas entry chamber between closed and open positions over the gas entry port, an attachment post projecting upwardly from said foot portion, said gas entry chamber being provided with a vertical front wall, an actuating rod for the slide valve having its rear end loosely connected to said attachment post and projecting forwardly therefrom and extending through said vertical front wall in sealing relationship, a shutter casting rotatably mounted on said main body casing for limited angular turning movements about the axis of said main body casing and including a movable shutter plate designed for cooperation with said fixed shutter plate, there being cooperating shutter openings in said shutter plates, defining a variable air inlet for the mixing chamber, said shutter casting having a vertical wall portion spaced from and in opposition to said vertical wall of the gas entry chamber, a plurality of adjusting screws arranged in an arcuate row and projecting through said vertical wall portion for individual axial adjustment, said adjusting screws being selectively movable into axial register and alignment with said valve actuating rod upon turning movement of the shutter casting, an elonagted arcuate strip of thin spring steel stock interposed between the projecting end of the valve actuating rod and the opposed ends of the adjusting screws, a friction shoe loosely mounted on the projecting end of said valve actuating rod for floating movement thereon, a compression spring surrounding said actuating rod exteriorly of the gas entry chamber, having one end thereof bearing against said vertical front wall and having its other end bearing against said friction shoe to yieldingly urge the shoe forwardly against said arcuate strip and bias the valve actuating rod in a direction to effect closing movements of the valve, and an operating lever on said shutter casting.

15. A proportioning apparatus as set forth in claim 12 and wherein the forward end of said gas entry port is of tapered design for point cut-off by said foot portion of the slide valve.

16. A proportioning apparatus as set forth in claim 12 and including, additionally, a pair of leaf springs secured to a wall of the gas entry chamber and bearing slidingly against the foot portion of the slide valve for maintaining said foot portion in sealing sliding contact with the top wall of the mixing chamber.

17. A proportioning apparatus as set forth in claim 12 and wherein the forward end of the gas entry port is of tapered design for point cut-off by said foot portion of the slide valve, and wherein the generally cylindrical wall of the mixing chamber is formed with a minimum air supply inlet therein.

18. A proportioning apparatus adapted to effect a combustible mixture of fuel and air for delivery to a burner or the like and comprising a main body casing of generally cylindrical design, having its axis extending horizontally and provided with a flattened side wall portion establishing a horizontal top wall for an internal fuel and air mixing chamber, the rear end of said chamber being open and providing a discharge outlet for the combustible mixture, a fixed shutter plate extending across the front end of the mixing chamber, said top wall being formed with a gas entry port therein for the mixing chamber, an inverted cup-shaped gas entry casing having an open lower end seated upon said top wall and, in combination therewith, defining a gas entry chamber, one wall of the gas entry casing being provided with a gas inlet for the gas entry chamber, a slide valve having a flat foot portion slidable upon said top wall of the main body casing within the gas entry chamber between closed and open positions over the gas entry port, an attachment post projecting upwardly from said foot portion, said gas entry chamber being provided with a vertical front wall, an actuating rod for the slide valve having its rear end loosely connected to said attachment post and projecting forwardly therefrom and extending through said vertical front wall in sealing relationship, a shutter casting rotatably mounted on said main body casing for limited angular turning movements about the axis of said main body casing and including a movable shutter plate designed for cooperation with said fixed shutter plate, there being cooperating shutter openings in said shutter plates defining a variable air inlet for the mixing chamber, said shutter casting having an arcuate channel-shaped housing portion including a vertical wall strip spaced from and in opposition to said vertical wall of the gas entry chamber, said channel-shaped housing embracing and concealing the projecting end of the valve actuating rod, a plurality of adjusting screws arranged in an arcuate row and projecting through said vertical wall strip and into the channel-shaped housing for individual axial adjustment, said adjusting screws being selectively movable into axial register and alignment with said valve actuating rod upon turning movement of the shutter casting, an elongated arcuate strip of thin flexible spring steel stock interposed between the projecting end of the valve actuating rod and the opposed ends of the adjusting screws within the channel-shaped housing and against which the projecting end of the actuating rod effectively bears, said arcuate strip being substantially coextensive with the channel-shaped housing portion, a pair of guide pins disposed at the opposite ends of said vertical wall strip and projecting inwardly of the channel-shaped housing portion, said arcuate strip being floatingly disposed within the channel-shaped housing portion and having its end regions slidable on the guide pins, and an operating lever on said shutter casting.

19. A proportioning apparatus as set forth in claim 16 and wherein said guide pins project completely through the vertical wall strip of the channel-shaped housing portion and are threaded exteriorly of the latter, said proportioning apparatus including, additionally, an arcuate channel-shaped cover casting enclosing the ends of said adjusting screws remote from the flexible strip, and securing nuts on the threaded portions of the guide pins and serving removably to secure the cover casting in position on the shutter casting.

References Cited in the file of this patent
UNITED STATES PATENTS

| | | |
|---|---|---|
| 1,314,003 | Leese | Aug. 26, 1919 |
| 1,495,545 | Anderson | May 27, 1924 |
| 1,683,128 | Diescher | Sept. 4, 1928 |
| 2,932,350 | Cooper | Apr. 12, 1960 |

FOREIGN PATENTS

| | | |
|---|---|---|
| 767,486 | Germany | Sept. 8, 1952 |